Figures 1, 2:
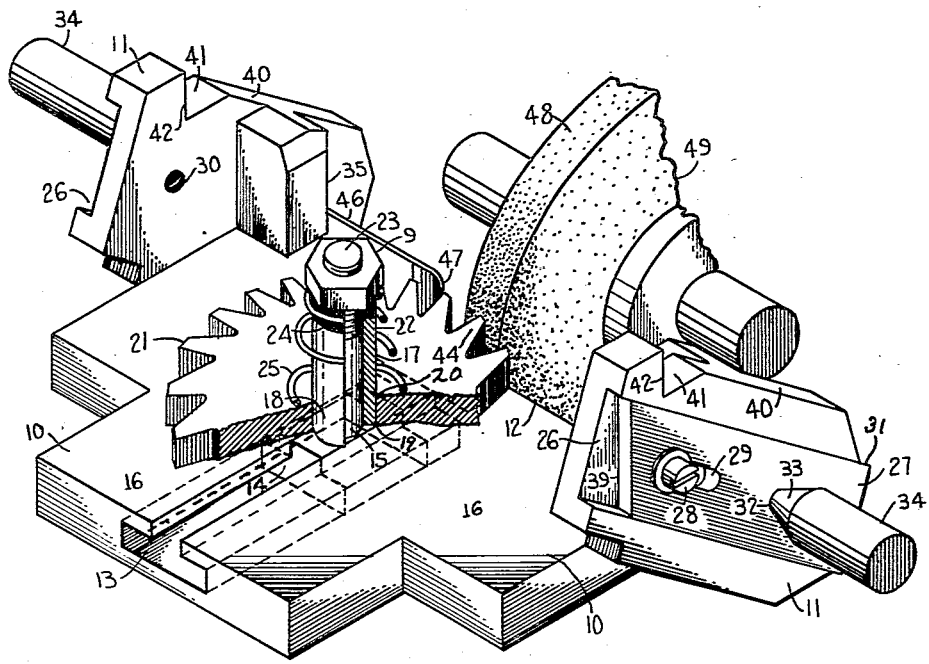

Oct. 15, 1957     W. H. HUNT ET AL     2,809,480

GRINDING FIXTURE

Filed March 23, 1956

INVENTORS.
W. H. HUNT
D. N. HUNT
BY
George Stett
AGENT

United States Patent Office 2,809,480
Patented Oct. 15, 1957

2,809,480

GRINDING FIXTURE

William H. Hunt and Douglas N. Hunt, Sr.,
National City, Calif.

Application March 23, 1956, Serial No. 573,371

4 Claims. (Cl. 51—225)

This invention relates to a grinding fixture and more particularly to a fixture for holding a circular milling cutter adjacent a grinding wheel while the cutter is moved along the face of the wheel in a manner to grind the corner of each cutting tooth thereof to an accurately shaped arcuate surface.

In many instances it is desirable to grind the corners of the cutting teeth of a milling cutter to an arcuate shape of predetermined radius so that the cut made by the cutter in the workpiece has rounded corners or fillets of known radius remaining therein. In grinding such arcuate surfaces it is important that each tooth be ground so that the cutting edges of the teeth remain concentric with the axis of the cutter to permit each tooth to preform its proper cutting function as the cutter is rotated.

It is therefore an object of this invention to provide a grinding fixture for holding a milling cutter while arcuate surfaces are ground on the corners of the teeth which are accurately uniform in shape and equidistant from the axis of the cutter.

Another object is to provide a grinding fixture on which the cutter may be quickly and accurately positioned for the grinding operation.

A further object is to provide a fixture which permits an arcuate surface of precisely predetermined radius to be ground on the corners of each tooth of a milling cutter.

A still further object is to provide a grinding fixture as above described which is of sturdy, inexpensive and relatively simple construction.

These and other objects and advantages of the invention will become apparent as the description thereof proceeds.

For a better understanding of the invention reference is made to the accompanying drawing wherein a preferred embodiment of the invention is illustrated and in which:

Fig. 1 is a perspective view of the fixture with a cutter mounted thereon adjacent a grinding wheel with portions of the cutter and fixture broken away to better illustrate the construction thereof, and Fig. 2 is a top view of the fixture with a cutter mounted thereon.

With reference to the drawing the fixture comprises a supporting plate 10 provided with upwardly projecting side members 11 adjacent its forward edge 12. A T shaped slot 13 arranged to slidably receive a T shaped bolt head 14 of a cutter supporting bolt 15, extends along the center of the upper surface 16 of plate 10. Bolt 15 extends upwardly from plate 10 at right angles to surface 16 and is provided with a sleeve 17 the lower end 18 of which is of such size as to slidably engage the wall 19 of the central opening 20 in a milling cutter 21. Lower end 18 of sleeve 17 engages surface 16 of plate 10 on each side of slot 13 and its upper end 22 extends above cutter 21. The upper end 23 of bolt 15 is threaded to receive a threaded nut 24 which engages the upper end 22 of sleeve 17 and a coil spring 25 surrounding bolt 15 and sleeve 17 is arranged to be compressed against cutter 21 by a second nut 9 on end 23 of bolt 15. Side members 11 are provided with slots 26 in horizontal alignment with each other and inclined at an angle of 45° to surface 16 of plate 10. Contained in slots 26 are bearing members 27 which are adjustably attached to side members 11 by bolts 28 passing through slots 29 therein and engaged in threaded openings 30 in members 11. Adjacent the forward ends 31 of members 27 are conical openings 32 arranged to receive the conical ends 33 of spaced apart aligned pivots 34 to pivotally support plate 10. Pivots 34 are preferably the type commonly known as centers such as are used to support various kinds of tools and workpieces mounted on mandrels on a machine tool. Extending from the inner sides of side members 11 are flat gage surfaces 35 lying in a plane normal to surface 16 of plate 10 and in horizontal alignment with each other. Gage surfaces 35 are positioned so that when bearing members 27 are set in their extreme forward positions as shown in Fig. 1, surfaces 35 and the centers of conical openings 32 are in precise horizontal alignment with each other and surface 16 of plate 10 and the centers of openings 32 lie in a common plane. A gage 36 arranged to extend between and engage surfaces 35 is removably secured to surfaces 35 by means of bolts 37. Gage 36 is provided with a small center block 38 one edge of which is in alignment with the center of bolt 15 for a purpose to be explained. The rearward ends 39 of bearing members 27 are inclined at an angle of 45° to the sides of members 27 and the upper edge 40 of side members 11 have notches 41 cut therein one side 42 of which is disposed parallel to end 39 of member 27. Since bearing members 27 are inclined at an angle of 45° to surface 16 of plate 10 and ends 39 and edges 42 are at an angle of 45° to the sides of members 27 it follows that the parallel surfaces of ends 39 and edges 42 are normal to surface 16 of plate 10. Notches 41 are positioned so that the distance between edge 42 and end 39 is an exact predetermined distance such as, for example, .500 of an inch, when bearing members 27 are in their extreme forward positions as shown in Fig. 1. With the basic distance between edges 42 and ends 39 established, any adjustment of the position of plate 10 and side members 11 relative to bearing members 27, in a manner to be described, may be accurately measured by measuring the distance between edges 42 and ends 39 with a precision measuring instrument.

To use the grinding fixture, bearing members 27 are positioned in their extreme forward positions as shown in Fig. 1 and gage 36 is secured to gage surfaces 35. Cutter 21 is placed on surface 16 of plate 10 around sleeve 17 and bolt 15 is then adjusted by moving head 14 along slot 13 until the face 43 of a tooth 44 of cutter 21 engages block 38 to align face 43 with the center of bolt 15. The peripheral edge 45 of tooth 44 is pressed against gage 36 to align edge 45 with surfaces 35 and thus align the lower corner of tooth 44 with the centers of openings 32 and surface 16 of plate 10. Nut 24 is then tightened pressing lower end 18 of sleeve 17 against surface 16 of plate 10 and drawing head 14 upwardly against the upper surface of slot 13 to lock bolt 15 in slot 13 and hold cutter 21 in adjusted position on plate 10. Spring 25 is placed around sleeve 17 and nut 9 is placed on end 23 of bolt 15 and tightened to compress spring 25 against cutter 21 to yieldingly hold the cutter in position. Pivots 34 are then engaged in openings 32 to pivotally support the fixture with cutter 21 thereon. As may be seen with cutter 21 thus positioned, the peripheral edge 45 of tooth 44 is in alignment with surfaces 35 and the lower corner of tooth 44 and surface 16 of plate 10 lie in a common plane with the corners in alignment with the centers of openings 32. Gage 36 is then removed from surfaces 35 and a spring steel indexing stop 46 of a known type is secured to one of surfaces 35 with its extending end 47 in engagement with the cutter tooth adjacent to tooth 44 to hold cutter 21 against unwanted rotation. Bolts 28 holding bearing members 27 are then loosened and plate 10 together with cutter 21 and side members 11 are moved forward so that the peripheral edge 45 of tooth 44 extends past the axis of pivots 34 a distance equal to the radius of the arcuate surface which is to be ground on the corner of tooth 44, and bolts 28 re-tightened. This distance is determined by measuring the distance between sides 42 of notches 41 and ends 39 of members 27. For example if the basic distance between sides 42 and ends 39 is .500 of an inch as previously mentioned, and the radius of the arcuate surface to be ground on the corner of tooth 44 is to be .125 of an inch then plate 10 is advanced until the distance between edges 42 and ends 39 is .625 of an inch. The peripheral edge 45 of tooth 44 will then extend past the axis of pivots 34 a distance of .125 of an inch so that rotational movement of plate 10 on pivots 34 will move edge 45 of tooth 44 through an arc of a circle having a radius of .125 of an inch with the center of the arc on the axis of pivots 34. Plate 10 is held in position so that bearing members 27 are in a horizontal plane and plate 10 and cutter 21 inclined at an angle of 45° while a grinding wheel 49 is advanced to engage tooth 44. Cutter 21 being held at a 45° angle, the corner of tooth 44 will come in contact with the face 48 of wheel 49 and by rotating plate 10 on pivots 34 the corner of tooth 44 will move through an arc of an circle along face 48 to grind the desired arcuate surface on tooth 44. When tooth 44 has been ground cutter 21 is rotated so that stop 46 engages the next booth and the grinding operation repeated by rotating plate 10 on pivots 34, the rotational movement being through an arc of approximately 90°. When each tooth has been ground the cutter may be removed from plate 10 turned over and replaced to grind the corners of the teeth on the other side. To provide clearance for wheel 49 as plate 10 is rotated on pivots 34 the forward edge of plate 10 is cut away as indicated by phantom line 50.

The fixture may be used in grinding a cutter as above described in any machine having aligned centers on which the fixture may be pivotally supported and on which a grinding wheel may be mounted such as, for example, a lathe.

This invention may be embodied in other forms or carried out in other ways without departing from the spirit or essential characteristics thereof. The present embodiment of the invention is therefore to be considered illustrative and not restrictive.

Having thus described our invention, what we claim as new and useful and desire to secure by Letters Patent is:

1. A grinding fixture for supporting a milling cutter adjacent a grinding wheel, comprising: a supporting plate having upwardly extending side members, said side members being provided with aligned plane surfaces disposed in a plane normal to the face of said plate and a groove in each of said side members lying in a common plane at an angle of 45° to the surface of said supporting plate; a bearing member movably secured in each of said grooves, said bearing members being provided with bearing surfaces in axial alignment with said plane surfaces and in a common plane with the surface of said supporting plate and arranged for pivotal engagement with spaced apart aligned pivots to pivotally support said plate; a gage member arranged to extend between and engage said plane surfaces; means for rotatably mounting a milling cutter on the surface of said supporting plate, said mounting means being adjustable in a plane normal to the axis of said pivots whereby the peripheral edge of said cutter is positioned in contact with said gage member to align the edge with the axis of said pivots; and means for advancing said supporting plate and cutter toward the grinding wheel a predetermined distance relative to said bearing members and said pivots whereby said cutter and plate are moved through an arc of predetermined radius upon pivotal movement of the plate.

2. A grinding fixture for supporting a milling cutter adjacent a grinding wheel, comprising: a supporting plate having upwardly extending side members connected thereto; a bearing member movably secured to each of said side members and disposed at an acute angle to the surface of said plate, said bearing members being provided with aligned bearing surfaces disposed in a common plane with the surface of said plate and arranged for engagement with spaced apart aligned supports to pivotally support said plate; means for rotatably mounting a milling cutter on said plate, said mounting means being adjustable in a plane normal to the axis of said pivots; means for aligning the peripheral edge of said cutter with the axis of said supports; and means for advancing said plate and cutter toward the grinding wheel a determinable distance relative to said bearing members.

3. A grinding fixture for supporting a milling cutter adjacent a grinding wheel, comprising: a supporting plate having upwardly extending side members connected thereto, said side members being provided with aligned plane surfaces disposed in a plane normal to the surface of said plate and guide surfaces extending at an acute angle to the surface of said plate; a bearing member movably secured to said guide surfaces on each of said side members, said bearing members being provided with aligned bearing surfaces in axial alignment with said plane surfaces and in a common plane with the surface of said supporting plate and arranged for engagement with spaced apart aligned pivots to pivotally support said plate; means for rotatably mounting a milling cutter on said supporting plate, said mounting means being adjustable in a plane normal to the axis of said pivots; means for aligning the peripheral edge of the cutter with said plane surfaces; and means for advancing said supporting plate and cutter toward the grinding wheel a predetermined distance relative to said bearing members.

4. A grinding fixture for supporting a milling cutter adjacent a grinding wheel, comprising: a supporting plate having upwardly extending side members, said side members being provided with aligned reference surfaces disposed in a plane normal to the surface of said plate and guide surfaces disposed at an angle of approximately 45° to the surface of said plate; a bearing member adjustably secured to each of said side members along said guide surfaces, said bearing members being provided with bearing surfaces in axial alignment with said reference surfaces and in a common plane with the surface of said supporting plate; means for rotatably mounting a milling cutter on said supporting plate, said mounting means being adjustable in a plane normal to the axis of said bearing surfaces; gage means for aligning the peripheral edge of the cutter with said reference surfaces; and means for advancing said supporting plate and cutter a predetermined distance toward the grinding wheel relative to said bearing members.

References Cited in the file of this patent
UNITED STATES PATENTS

| | | |
|---|---|---|
| 1,602,522 | Bugby | Oct. 12, 1926 |
| 1,624,658 | Devine | Apr. 12, 1927 |
| 1,987,832 | Knight | Jan. 15, 1935 |
| 2,457,895 | Hohwart et al. | Jan. 4, 1949 |
| 2,475,054 | Ryan | July 5, 1949 |
| 2,526,507 | Ryan | Oct. 17, 1950 |